(12) United States Patent
Kim et al.

(10) Patent No.: US 11,369,817 B1
(45) Date of Patent: Jun. 28, 2022

(54) WATCHTOWER VEHICLE

(71) Applicant: National Institute of Meteorological Sciences, Seogwipo-si (KR)

(72) Inventors: Geon Tae Kim, Gangneung-si (KR); Seon Jeong Kim, Gangneung-si (KR)

(73) Assignee: National Institute of Meteorological Sciences, Seogwipo-si (KR)

( * ) Notice: Subject to any disclaimer, the term of this patent is extended or adjusted under 35 U.S.C. 154(b) by 0 days.

(21) Appl. No.: 17/674,296

(22) Filed: Feb. 17, 2022

(30) Foreign Application Priority Data

Feb. 25, 2021 (KR) .......................... 10-2021-0026030

(51) Int. Cl.
*A62C 3/02* (2006.01)
*E04H 12/34* (2006.01)
*G01W 1/00* (2006.01)
*H04N 5/225* (2006.01)
*H04N 5/232* (2006.01)
*B60S 9/02* (2006.01)

(52) U.S. Cl.
CPC ........... *A62C 3/0271* (2013.01); *E04H 12/34* (2013.01); *G01W 1/00* (2013.01); *H04N 5/2253* (2013.01); *H04N 5/23299* (2018.08); *B60S 9/02* (2013.01)

(58) Field of Classification Search
None
See application file for complete search history.

(56) References Cited

U.S. PATENT DOCUMENTS

2022/0017336 A1* 1/2022 Ishikawa ................. B66C 13/22

FOREIGN PATENT DOCUMENTS

| JP | 2006215906 | 8/2006 |
|---|---|---|
| KR | 1020050038851 | 4/2005 |
| KR | 100746052 | 7/2007 |
| KR | 101788219 | 10/2017 |
| KR | 1020170131094 | 11/2017 |
| KR | 102149545 | 10/2020 |

* cited by examiner

*Primary Examiner* — Christopher Braniff
(74) *Attorney, Agent, or Firm* — David R. Stevens; Stevens Law Group

(57) ABSTRACT

A watchtower vehicle, including: a top plate engaged with a top of a vehicle; an extendable boom, with a first end thereof engaged with the top plate, wherein the extendable boom is allowed to be inclined from a vertical axis of the top plate within a first angle range; a main sensor mounting unit, engaged with a second end of the extendable boom, for mounting at least one sensor thereon, wherein the main sensor mounting unit is allowed to be inclined from a longitudinal axis of the extendable boom within a second angle range; a sensor module unit including the sensor mounted on the main sensor mounting unit; and a control module for controlling or supporting another module to control at least one of the extendable boom within the first angle range and the main sensor mounting unit within the second angle range.

16 Claims, 4 Drawing Sheets

WATCHTOWER VEHICLE

CROSS REFERENCE TO RELATED APPLICATION

This application claims the benefit of priority to Korean Non-Provisional Patent Application No. 10-2021-0026030, filed on Feb. 25, 2021, the entire contents of which being incorporated herein by reference.

FIELD OF THE DISCLOSURE

The present disclosure relates to a watchtower vehicle; and more particularly, to the watchtower vehicle capable of monitoring a surrounding situation and measuring directions and strengths of wind from different heights.

BACKGROUND OF THE DISCLOSURE

Generally, in order to monitor an occurrence of wildfire, on condition that wildfire watch posts and towers have been installed on mountain ridges and peaks across the country, images are acquired through cameras, etc. (for example, Korean Patent Registration No. 10-0746052).

However, there are problems in that land ownerships should be figured out to install the wildfire watch posts and towers and that an observance of the wildfire varies depending on diligence of guards.

As another example, in case of using drones for monitoring the wildfire (for example, Korean Patent Registration No. 10-2090170), the drones have a problem of short flight time resulting in a difficulty in continuous image acquisitions. The drones also cannot be deployed in windy weather, and require post-flight cares such as charging and maintenance.

Besides, when the wildfire actually occurs, it may be necessary to acquire the images of the wildfire from a high vantage point for recognizing a direction of a spread of the wildfire, or it may be of utmost importance to acquire wind information of an affected region, however, acquiring the images from the high vantage point is not easy and acquiring the wind information is even more out of reach.

Currently, the wind information of the affected region depends entirely on data acquired from a nearby meteorological station of the Korea Meteorological Administration, and only simple instruments that can measure at a height of 3 m or less are used in fields; therefore, there is a problem in acquiring high-resolution wind information for various conditions of various sites.

Consequently, there is a need for a watchtower vehicle capable of moving, capturing pictures from a vantage point, and measuring directions and strengths of wind from different heights.

SUMMARY OF THE DISCLOSURE

It is an object of the present disclosure to solve all the aforementioned problems.

It is another object of the present disclosure to acquire continuously robust images from a high vantage point and measure meteorological data such as directions and strengths of wind for different heights by using an extendable boom mounted on a vehicle.

It is still another object of the present disclosure to relieve a wind load received by the extendable boom by tilting the extendable boom according to the directions and the strengths of wind.

It is still yet another object of the present disclosure to allow a weather sensor to maintain its level in order to accurately measure the directions and the strengths of wind.

It is still yet another object of the present disclosure to determine a height of a sensor for measuring the directions and the strengths of wind by using a length and an inclination angle of the extendable boom to prevent a substantial error in an altitude measured by a GPS while the extendable boom is swinging due to strong wind.

It is still yet another object of the present disclosure to enable a measuring of the directions and the strengths of wind by moving to a site of the wildfire or a good site for taking measurement.

It is still yet another object of the present disclosure to transmit the acquired images and the acquired meteorological data to a control room, etc. to better inform what is happening on-site, to thereby support decision in wildfire extinguishment, etc., and apply the decision to a predictive program such as a wildfire spread predictive program.

In order to achieve the above objects and achieve the desired results that will be introduced hereinafter, the configuration of the present invention is as follows:

In accordance with one aspect of the present disclosure, there is provided a watchtower vehicle, including: a top plate engaged with a top of a vehicle; an extendable boom, with a first end thereof engaged with the top plate, capable of being extended up to a predetermined length, wherein the extendable boom is allowed to be inclined from a vertical axis of the top plate within a first angle range; a main sensor mounting unit, engaged with a second end of the extendable boom, for mounting at least one sensor thereon, wherein the main sensor mounting unit is allowed to be inclined from a longitudinal axis of the extendable boom within a second angle range; a sensor module unit including the sensor mounted on the main sensor mounting unit; and a control module for controlling or supporting another module to control at least one of the extendable boom within the first angle range and the main sensor mounting unit within the second angle range; wherein the sensor module unit includes (i) an image sensor for photographing a surrounding situation, (ii) a first weather sensor for measuring a wind direction and a wind speed, and (iii) a first digital compass for measuring a first horizontal slope, which is a degree of inclination of the main sensor mounting unit from a horizontal state of the main sensor mounting unit, and a first deviated angle, which is a degree of deviation of the main sensor mounting unit from a true north, wherein the control module controls or supports another module to control the extendable boom to be inclined at a specific angle within the first angle range by referring to the wind direction and the wind speed measured by the first weather sensor, wherein a latitude and a longitude of location information of the sensor module unit are determined by a latitude and a longitude of a GPS included in the vehicle, and wherein an altitude of the location information of the sensor module unit is determined by a sum of an altitude of the GPS and a first height, which is determined by referring to the predetermined length of the extendable boom and the specific angle.

As one example, Z1, which is the first height measured from the second end of the extendable boom to an intersection point where a virtual line descending from the second end of the extendable boom meets perpendicularly with a virtual horizontal plane of a ground the vehicle is located, is determined as a product of (i) a sine value of angle α, which is the specific angle between the extendable boom and the virtual horizontal plane, and (ii) a height X, which is the predetermined length defined by a length between the first end to the second end of the extendable boom.

As one example, the control module controls or supports another module to control the main sensor mounting unit within the second angle range such that the main sensor mounting unit maintains its level by referring to the first horizontal slope.

As one example, a first end of a support structure is rotatably engaged with the second end of the extendable boom and a second end of the support structure is fixedly engaged with a base of the main sensor mounting unit, and a point in between the first end of the support structure and the second end of the support structure is engaged with a hydraulic device, and wherein an inclined angle of the main sensor mounting unit is allowed to be adjusted within the second angle range in response to an actuation of the hydraulic device controlled by the control module.

In accordance to another aspect of the present disclosure, there is provided a watchtower vehicle, including: a top plate engaged with a top of a vehicle; an extendable boom, with a first end thereof engaged with the top plate, capable of being extended up to a predetermined length, wherein the extendable boom is allowed to be inclined from a vertical axis of the top plate within a first angle range; a main sensor mounting unit, engaged with a second end of the extendable boom, for mounting at least one sensor thereon, wherein the main sensor mounting unit is allowed to be inclined from a longitudinal axis of the extendable boom within a second angle range; a sensor module unit including the sensor mounted on the main sensor mounting unit; and a control module for controlling or supporting another module to control at least one of the extendable boom within the first angle range and the main sensor mounting unit within the second angle range; wherein the sensor module unit includes (i) an image sensor for photographing a surrounding situation, (ii) a first weather sensor for measuring a wind direction and a wind speed, and (iii) a first digital compass for measuring a first horizontal slope, which is a degree of inclination of the main sensor mounting unit from a horizontal state of the main sensor mounting unit, and a first deviated angle, which is a degree of deviation of the main sensor mounting unit from a true north, and wherein the first weather sensor is mounted on the main sensor mounting unit such that a reference direction of the wind direction measured by the first weather sensor corresponds to a direction of the true north measured by the first digital compass.

As one example, a final wind direction measured by the sensor module unit is determined by adding or subtracting the first deviated angle to or from the reference direction.

In accordance to still another aspect of the present disclosure, there is provided a watchtower vehicle, including: a top plate engaged with a top of a vehicle; an extendable boom, with a first end thereof engaged with the top plate, capable of being extended up to a predetermined length, wherein the extendable boom is allowed to be inclined from a vertical axis of the top plate within a first angle range; a main sensor mounting unit, engaged with a second end of the extendable boom, for mounting at least one sensor thereon, wherein the main sensor mounting unit is allowed to be inclined from a longitudinal axis of the extendable boom within a second angle range; a sensor module unit including the sensor mounted on the main sensor mounting unit; and a control module for controlling or supporting another module to control at least one of the extendable boom within the first angle range and the main sensor mounting unit within the second angle range; wherein the watchtower vehicle further includes: at least one sub sensor mounting unit, which is engaged with at least one predetermined position of a side surface of the extendable boom, for mounting a second weather sensor and a second digital compass capable of measuring a wind direction and a wind speed, and wherein the sub sensor mounting unit is allowed to be inclined from the longitudinal axis of the extendable boom within a third angle range.

As one example, the control module controls or supports another module to control the sub sensor mounting unit within the third angle range such that the sub sensor mounting unit maintains its level by referring to a second horizontal slope which is a degree of inclination of the second digital compass from a horizontal state of the second digital compass.

As one example, the sub sensor mounting unit is engaged with a leveling unit mounted on the at least one predetermined position of the side surface of the extendable boom, wherein the leveling unit has grooves with a predetermined curvature formed therein to accommodate a rotating shaft driven by a servomotor at a center of the predetermined curvature.

As one example, a first support member formed on a side surface of the sub sensor mounting unit is engaged with the rotating shaft, and a second support member formed on the side surface of the sub sensor mounting unit is slidably engaged with the grooves along the predetermined curvature, and wherein the second support member is moved by a predetermined amount through an inward of the grooves with the predetermined curvature while the rotating shaft is rotating in response to an actuation of the servomotor by the control module, to thereby adjust an inclined angle of the sub sensor mounting unit.

As one example, the second weather sensor is mounted on the sub sensor mounting unit such that a reference direction of the wind direction measured by the second weather sensor corresponds to a direction of the true north measured by the second digital compass, and wherein a final wind direction measured by the second weather sensor and the second digital compass in the sub sensor mounting unit is determined by adding or subtracting a second deviated angle measured by the second digital compass, which is a degree of deviation of the sub sensor mounting unit from the true north, to or from the reference direction.

As one example, the sensor module unit includes (i) an image sensor for photographing a surrounding situation, (ii) a first weather sensor for measuring a wind direction and a wind speed, and (iii) a first digital compass for measuring a first horizontal slope, which is a degree of inclination of the main sensor mounting unit from a horizontal state of the main sensor mounting unit, and a first deviated angle, which is a degree of deviation of the main sensor mounting unit from a true north, wherein the control module controls or supports another module to control the extendable boom to be inclined at a specific angle within the first angle range by referring to the wind direction and the wind speed measured by the first weather sensor, wherein a latitude and a longitude of location information of the sub sensor mounting unit are determined by a latitude and a longitude of a GPS included in the vehicle, and wherein an altitude of the location information of the sub sensor module unit is determined by a sum of a second height, which is determined by referring to a height of the at least one predetermined position where the sub sensor mounting unit is engaged and the specific angle, and an altitude of the GPS.

As one example, Z2, which is the second height measured from the at least one predetermined position of the extendable boom to an intersection point where a virtual line descending from the at least one predetermined position of a side surface of the extendable boom meets perpendicularly with a virtual horizontal plane of a ground the vehicle is located, is determined as a product of (i) a sine value of angle α, which is the specific angle between the extendable boom and the virtual horizontal plane, and (ii) a length Y, which is a length from the first end of the extendable boom to the at least one predetermined position.

As one example, the extendable boom is at least one of (i) a segmented boom capable of being extended to the predetermined length by extending one or more sub booms which are foldably engaged with a main boom, mounted onto the top plate, in a predetermined angle, (ii) a hydraulic boom capable of being extended to the predetermined length by drawing out one or more sub booms embedded in the main boom mounted onto the top plate, and (iii) a combination boom configured as a combination of the segmented boom and the hydraulic boom.

As one example, the top plate is rotatably engaged with the vehicle such that the top plate is allowed to be rotated by the control module.

As one example, the watchtower vehicle further includes: one or more outriggers mounted to the vehicle to thus fix the vehicle in place, adjust an inclination of the vehicle to level the vehicle, and distribute a load of the vehicle caused by the extendable boom.

BRIEF DESCRIPTION OF THE DRAWINGS

The following drawings to be used for explaining example embodiments of the present disclosure are only part of example embodiments of the present disclosure and other drawings can be acquired based on the drawings by those skilled in the art of the present disclosure without inventive work.

DETAILED DESCRIPTION OF THE PREFERRED EMBODIMENTS

Figure 1:
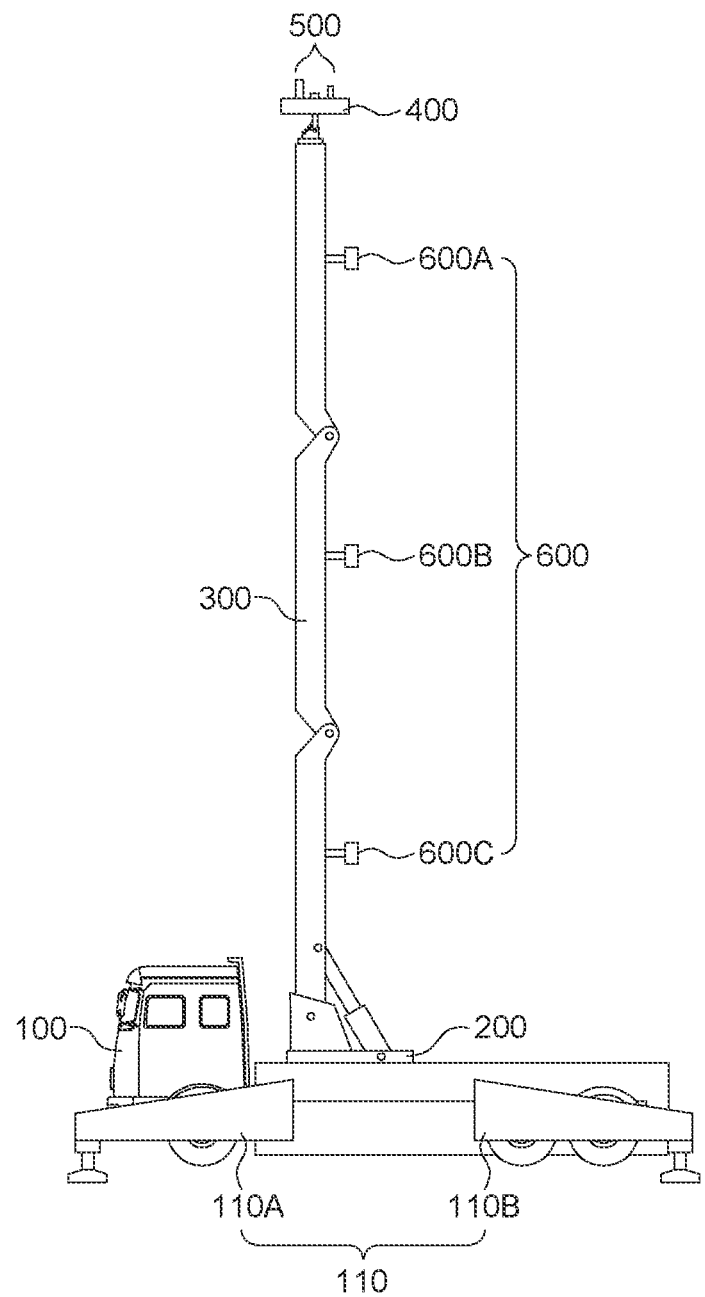
FIG. 1 is a drawing schematically illustrating a watchtower vehicle in accordance with one example embodiment of the present disclosure.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention.

In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to carry out the present invention easily, the example embodiments of the present invention by referring to attached diagrams will be explained in detail as shown below.

FIG. 1 is a drawing schematically illustrating a watchtower vehicle in accordance with one example embodiment of the present disclosure.

Referring to FIG. 1, the watchtower vehicle may include a vehicle 100, a top plate 200, an extendable boom 300, a main sensor mounting unit 400, a sensor module unit 500, a sub sensor mounting unit 600, and a control module (not illustrated).

In addition, the watchtower vehicle may further include a transmission device (not illustrated) for transmitting measured data to a server located outside, etc., and a signal amplifier (not illustrated) or a wireless communication repeater (not illustrated) for communicating smoothly with the server located outside.

Firstly, the vehicle 100 may include a GPS.

Further, the vehicle 100 may have one or more outriggers 110 mounted thereto to thus fix the vehicle 100 in place, adjust an inclination of the vehicle 100 to level the vehicle 100, and distribute a load of the vehicle 100 caused by the extendable boom 300.

Furthermore, the vehicle 100 may include a battery for supplying power to electronic devices mounted on the watchtower vehicle, and a PTO (Power Take Off) for allowing an engine of the vehicle 100 to be used as a generator.

Additionally, the top plate 200 may be engaged with a top of the vehicle 100.

Herein, the top plate 200 is rotatably engaged with the vehicle 100 such that the top plate 200 is allowed to be rotated by the control module.

Next, the extendable boom 300 may have a first end thereof engaged with the top plate 200. Herein, the extendable boom 300 may be engaged with the top plate 200 such that the extendable boom 300 is allowed to be inclined from a vertical axis of the top plate 200 within a first angle range. Herein, the extendable boom 300 may be inclined by a hydraulic actuator, but it is not limited thereto, and may be inclined by various actuators such as an electric actuator and a pneumatic actuator.

Further, the extendable boom 300 may be extended up to a predetermined length. Herein, the extendable boom 300 may include a main boom and one or more sub booms. Herein, the main boom is engaged with the top plate 200, a first sub boom is engaged with the main boom, and a second sub boom may be engaged with the first sub boom. Specifically, the extendable boom 300 may be at least one of (i) a segmented boom capable of being extended to the predetermined length by extending the sub booms which are foldably engaged with the main boom, mounted onto the top plate, in a predetermined angle, (ii) a hydraulic boom capable of being extended to the predetermined length by drawing out one or more sub booms embedded in the main boom mounted onto the top plate 200, and (iii) a combination boom configured as a combination of the segmented boom and the hydraulic boom, but it is not limited to thereto.

Next, the main sensor mounting unit 400 may be engaged with a second end of the extendable boom 300 for mounting at least one sensor thereon. Herein the main sensor mounting unit 400 may be engaged with the second end of the extendable boom 300 to be inclined from a longitudinal axis of the extendable boom 300 within a second angle range.

Figure 2:
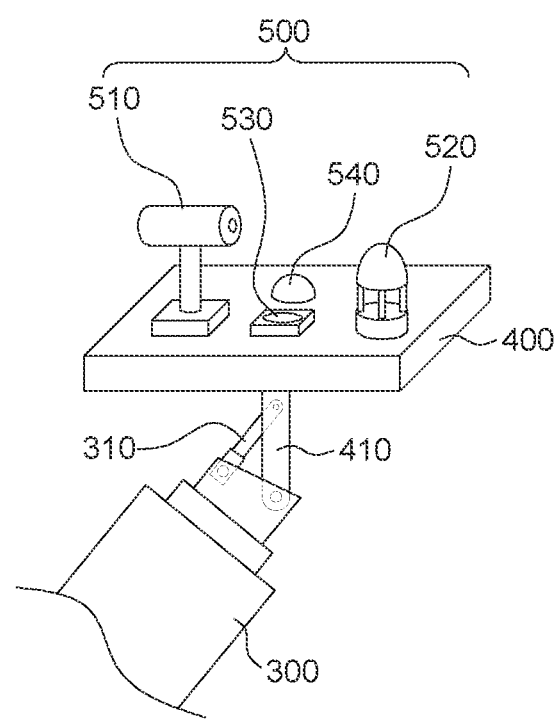
FIG. 2 is a drawing illustrating an extendable boom and a main sensor mounting unit that are engaged with each other, and one or more sensors mounted on the main sensor mounting unit in accordance with one embodiment of the present disclosure.

Referring to FIG. 2, a support structure 410 which is engaged with a base of the main sensor mounting unit 400 may be engaged with the second end of the extendable boom 300. Specifically, a first end of the support structure 410 is rotatably engaged with the second end of the extendable boom 300 and a second end of the support structure 410 is fixedly engaged with the base of the main sensor mounting unit 400. In addition, a point in between the first end of the support structure 410 and the second end of the support structure 410 may be engaged with a hydraulic device 310 which is engaged with the second end of the extendable boom 300. Herein, the hydraulic device 310 may be a hydraulic cylinder or the hydraulic actuator, but it is not limited thereto.

Further, the main sensor mounting unit 400 may further include a light (e.g., search light) that can greatly illuminate a dark place or a wide area.

Next, the sensor module unit 500 may be mounted on the main sensor mounting unit 400 and may include at least one sensor.

Specifically, with reference to FIG. 2, the sensor module unit 500 may include (i) an image sensor 510 for photographing a surrounding situation, (ii) a first weather sensor 520 for measuring a wind direction and a wind speed, and (iii) a first digital compass 530 for measuring a first horizontal slope, which is a degree of inclination of the main sensor mounting unit 400 from a horizontal state of the main sensor mounting unit 400, and a first deviated angle, which is a degree of deviation of the main sensor mounting unit 400 from a true north. Additionally, the sensor module unit 500 may include a GPS capable of measuring a latitude, a longitude, and an altitude.

Herein, the image sensor 510 may be an image capturing device capable of capturing images, but it is not limited thereto. Herein, the image capturing device may be a camera that is capable of rotating 360 degrees left and right, and 80 degrees up and down. It may be a thermal infrared camera, but it is not limited thereto, and the image capturing device may include a plurality of cameras. Also, gimbals may be installed on the image capturing device in order to stabilize an image captured from it.

Further, the first weather sensor 520 may be mounted on the main sensor mounting unit 400 such that it is situated nearby the first digital compass 530, and may be mounted on the main sensor mounting unit 400 with the first digital compass 530 directly engaged with a base of the first weather sensor 520.

Furthermore, the first weather sensor 520 may be mounted on the main sensor mounting unit 400 such that a reference direction of the wind direction measured by the first weather sensor 520 may correspond to a direction of the true north measured by the first digital compass 530. Herein, the first weather sensor 520 may measure wind in 360 degrees, and the wind direction measured by the first weather sensor 520 may be expressed as a degree of deviation from the reference direction.

Hence, by allowing the reference direction of the first weather sensor 520 to correspond to the direction of the true north, a final wind direction measured by the sensor module unit 500 is determined by adding or subtracting a first deviated angle measured by the first digital compass 530 to or from the reference direction of the first weather sensor 520.

Moreover, the image sensor 510, the first weather sensor 520, and the first digital compass 530 may be mounted on the sensor module unit 500 such that they are placed in a certain direction in the order of: the first weather sensor 520, first digital compass 530, and the image sensor 510. Herein, the certain direction may be a direction which the wind is blowing from or the extendable boom 300 is inclined towards, but it is not limited thereto.

Next, the sub sensor mounting unit 600 may be engaged with at least one predetermined position on a side surface of the extendable boom 300, and may mount at least one weather sensor capable of measuring the wind direction and the wind speed. Herein, the weather sensor may include a second weather sensor and a second digital compass. Also, at a base of the sub sensor mounting unit 600, there may be a weight coupled thereto.

Herein, the sub sensor mounting unit 600 may be mounted on the side surface of the extendable boom 300 such that it is allowed to be inclined from the longitudinal axis of the extendable boom 300 within a third angle range.

Figure 3:
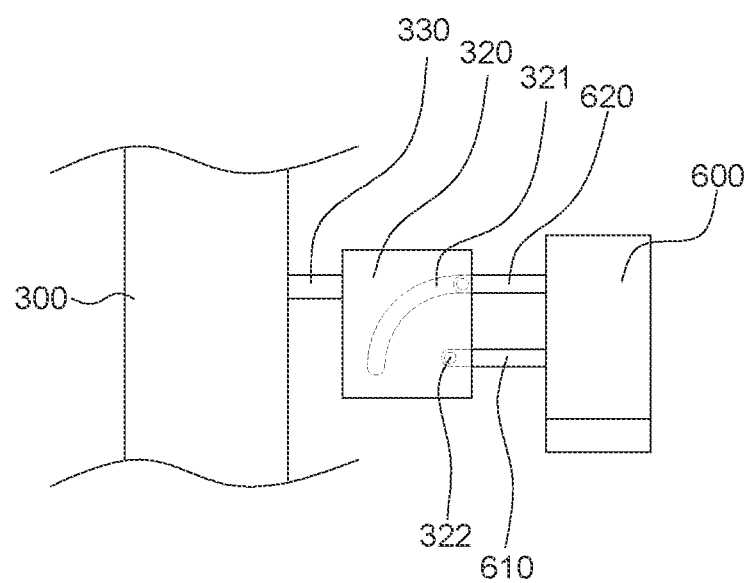
FIG. 3 is a drawing illustrating the extendable boom and a sub sensor mounting unit that are engaged with each other in accordance with one embodiment of the present disclosure.

Referring to FIG. 3, the sub sensor mounting unit 600 may be engaged with a leveling unit 320 mounted on the at least one predetermined position of the side surface of the extendable boom 300. Herein, a spacing support structure 330 may be formed between the side surface of the extendable boom 300 and the leveling unit 320. Also, the leveling unit 320 may have grooves 321 with a predetermined curvature formed therein to accommodate a rotating shaft 322 driven by a servomotor (not illustrated) at a center of the predetermined curvature.

Herein, a first support member 610 formed on a side surface of the sub sensor mounting unit 600 is engaged with the rotating shaft 322, and a second support member 620 formed on the side surface of the sub sensor mounting unit 600 is slidably engaged with the grooves 321 along the predetermined curvature.

Further, the second weather sensor may be mounted on the sub sensor mounting unit 600 such that the reference direction of the wind direction measured by the second weather sensor corresponds to a direction of the true north measured by the second digital compass. Herein, the second weather sensor may measure the wind in 360 degrees, and the wind direction measured by the second weather sensor may be expressed as a degree of deviation from the reference direction.

Hence, by allowing the reference direction of the second weather sensor to correspond to the direction of the true north, a final wind direction measured by the sub sensor module unit 600 is determined by adding or subtracting a second deviated angle measured by the second digital compass to or from the reference direction of the second weather sensor.

Next, the control module may control or support another module to control at least one of the extendable boom 300 within the first angle range and the main sensor mounting unit 400 within the second angle range.

Herein, the control module may control or support another module to control the extendable boom 300 to be inclined at a specific angle within the first angle range by referring to the wind direction and the wind speed measured by the first weather sensor 520. That is, there is a danger of the extendable boom 300 being overturned in an opposite direction of the wind because of significant wind load received when the extendable boom 300 is vertically erected and the wind is blowing strongly. Therefore, in order to reduce such a risk and measure the wind stably and continuously without changing a position of the first weather sensor 520 and the second weather sensor, the control module may incline the extendable boom 300 towards a direction of the wind blowing by referring to the wind direction and the wind speed, to thereby decrease the risk of the extendable boom 300 being overturned. Herein, an angle at which the extendable boom 300 is inclined may vary depending on a strength of the wind. That is, when the wind is blowing strongly an inclination of the extendable boom 300 will be large, and when the wind is blowing weakly the inclination of the extendable boo arm 300 will be small.

Herein, while the extendable boom 300 is inclined in the specific angle, a latitude and a longitude of location information of the sensor module unit 500 for measuring the wind direction and the wind speed may be determined by a latitude and a longitude of the GPS included in the vehicle, and an altitude of the location information of the sensor module unit 500 may be determined by a sum of an altitude of the GPS and a first height, which is determined by referring to the predetermined length of the extendable boom 300 and the specific angle. It is to be understood that if the GPS 540 is included in the sensor module unit 500, the latitude and the longitude of the location information of the sensor module unit 500 may be determined by the GPS 540 included in the sensor module unit 500.

Figure 4:
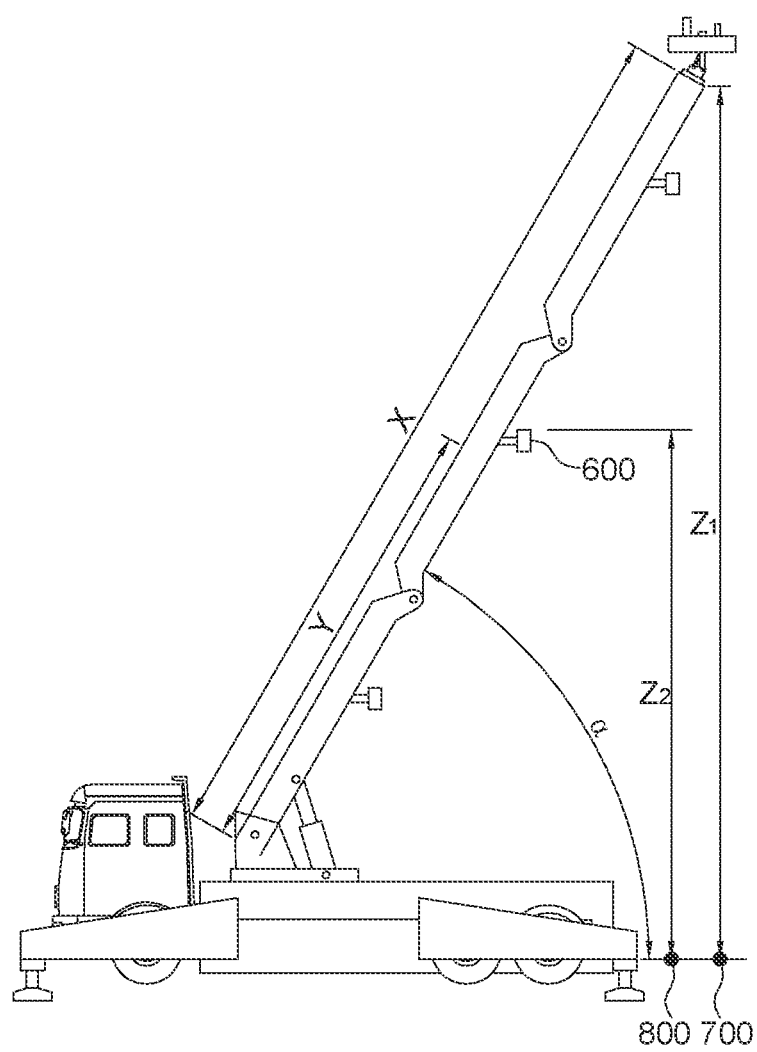
FIG. 4 is a drawing illustrating a first height and a second height in accordance with one embodiment of the present disclosure.

Herein, with reference to FIG. 4, Z1, which is the first height measured from the second end of the extendable boom 300 to an intersection point where a virtual line descending from the second end of the extendable boom 300 meets perpendicularly with a virtual horizontal plane of a ground the vehicle is located, is determined as a product of (i) a sine value of angle $\alpha$, which is the specific angle between the extendable boom 300 and the virtual horizontal plane, and (ii) a length X, which is the predetermined length defined by a length between the first end to the second end of the extendable boom 300. Herein, the specific angle $\alpha$ may be measured by an angle sensor, etc., and determined by the control module.

That is, by using the sine rule, $\sin \alpha = (X/Z1)$, hence, the first height Z1 may be determined by using $Z1 = \sin \alpha * X$.

By adding the first height determined in such a way to the altitude of the GPS 540, the altitude of the sensor module unit 500 may be determined, that is, an altitude of the wind direction and the wind speed measured by the first weather sensor 520 may be determined.

Further, when the extendable boom 300 is inclined in the specific angle, a latitude and a longitude of the location information of the sub sensor mounting unit 600 may be determined by the latitude and the longitude of a GPS included in the vehicle, and an altitude of the location information of the sub sensor module unit 600 may be determined by a sum of a second height, which is determined by referring to a height of the at least one predetermined position where the sub sensor mounting unit 600 is engaged with and the specific angle, and an altitude of the GPS.

Herein, with reference to FIG. 4, Z2, which is the second height measured from the at least one predetermined position of the extendable boom 300 to an intersection point where a virtual line descending from the at least one predetermined position of the extendable boom meets perpendicularly with the virtual horizontal plane of the ground the vehicle is located, is determined as a product of (i) a sine value of angle $\alpha$, which is the specific angle between the extendable boom 300 and the virtual horizontal plane, and (ii) a length Y, which is a length from the first end of the extendable boom 300 to the at least one predetermined position. That is, just as determining the first height Z1, by using the sine rule, since $\sin \alpha = (Y/Z2)$, the second height Z2 may be determined by using $Z2 = \sin \alpha * Y$.

By adding the second height determined in such a way to the altitude of the GPS 540, the altitude of the sub sensor module unit 600 may be determined, that is, the altitude of the wind direction and the wind speed measured by the second weather sensor may be determined.

Furthermore, the control module may control or support another module to control the main sensor mounting unit 400 within the second angle range such that the main sensor mounting unit 400 maintains its level by referring to the first horizontal slope measured by the first digital compass 530.

Herein, the control module may actuate or support another module to actuate the hydraulic device 310 formed on the second end of the extendable boom 300, and may rotate the support structure 410 which is rotatably engaged with the second end of the extendable boom 300, to thereby adjust the inclination of the main sensor mounting unit 400.

Moreover, the control module controls or supports another module to control the sub sensor mounting unit 600 within the third angle range such that the sub sensor mounting unit 600 maintains its level by referring to a second horizontal slope which is a degree of inclination of the second digital compass from a horizontal state of the second digital compass.

Herein, the control module may drive or support another module to drive the servomotor included in the leveling unit 320 so that the second support member 620 is moved by a predetermined amount through an inward of the grooves 321 with the predetermined curvature while the rotating shaft 322 is rotating in response to an actuation of the servomotor by the control module, to thereby adjust an inclined angle of the sub sensor mounting unit 600.

A process of measuring the wind direction and the wind speed for each altitude and capturing an image using the watchtower vehicle described above in accordance with one embodiment of the present invention will be described below.

First, when the watchtower vehicle travels to a site to measure the wind direction and wind speed, the outriggers 110 may allow the vehicle to be fixed and maintain its level.

Further, the control module may adjust the extendable boom 300 to be perpendicular with the top plate 200, and extend the extendable boom 300 to the predetermined length.

Next, the control module may adjust the extendable boom 300 to be inclined at the specific angle in the direction of the wind blowing by referring to the wind direction and the wind speed measured by the first weather sensor 520.

Next, the control module may adjust the main sensor mounting unit 400 to be leveled by referring to the first deviation angle measured by the first digital compass 530, and may adjust the sub sensor mounting unit 600 to be leveled by referring to the second deviation angle measured by the second digital compass.

Next, when the extendable boom 300 is inclined at the specific angle and the main sensor mounting unit 400 and the sub sensor mounting unit 600 are maintaining their levels, the control module may transmit the image captured by the image sensor 510, and the wind direction and the wind speed measured by the first weather sensor 520 and the second weather sensor to a server.

The present disclosure has an effect of acquiring fixed and continuously robust images from a high vantage point, and measuring meteorological data such as directions and strengths of wind for different heights by using the extendable boom mounted on the vehicle.

The present disclosure has another effect of being able to relieve a wind load received by the extendable boom by tilting the extendable boom according to the directions and the strengths of wind.

The present disclosure has still another effect of allowing a weather sensor to maintain its level in order to accurately measure the directions and the strengths of wind.

The present disclosure has still yet another effect of determining a height of a sensor for measuring the directions and the strengths of wind by using a length and an inclination angle of the extendable boom to prevent a substantial error in the altitude measured by the GPS while the extendable boom is swinging due to strong wind.

The present disclosure has still yet another effect of enabling a measuring of the directions and the strengths of wind by moving to a site of the wildfire or a good site for taking measurement.

The present disclosure has still yet another effect of transmitting the acquired images and the acquired meteorological data to a control room, etc. to better inform what is happening on-site, to thereby support decision in wildfire extinguishment, etc., and apply the decision to a predictive program such as a wildfire spread predictive program.

As seen above, the present disclosure has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A watchtower vehicle, comprising:
a top plate engaged with a top of a vehicle;
an extendable boom, with a first end thereof engaged with the top plate, capable of being extended up to a predetermined length, wherein the extendable boom is allowed to be inclined from a vertical axis of the top plate within a first angle range;
a main sensor mounting unit, engaged with a second end of the extendable boom, for mounting at least one sensor thereon, wherein the main sensor mounting unit is allowed to be inclined from a longitudinal axis of the extendable boom within a second angle range;
a sensor module unit including the sensor mounted on the main sensor mounting unit; and
a control module for controlling or supporting another module to control at least one of the extendable boom within the first angle range and the main sensor mounting unit within the second angle range;
wherein the sensor module unit includes (i) an image sensor for photographing a surrounding situation, (ii) a first weather sensor for measuring a wind direction and a wind speed, and (iii) a first digital compass for measuring a first horizontal slope, which is a degree of inclination of the main sensor mounting unit from a horizontal state of the main sensor mounting unit, and a first deviated angle, which is a degree of deviation of the main sensor mounting unit from a true north,
wherein the control module controls or supports another module to control the extendable boom to be inclined at a specific angle within the first angle range by referring to the wind direction and the wind speed measured by the first weather sensor,
wherein a latitude and a longitude of location information of the sensor module unit are determined by a latitude and a longitude of a GPS included in the vehicle, and
wherein an altitude of the location information of the sensor module unit is determined by a sum of an altitude of the GPS and a first height, which is determined by referring to the predetermined length of the extendable boom and the specific angle.

2. The watchtower vehicle of claim 1, wherein Z1, which is the first height measured from the second end of the extendable boom to an intersection point where a virtual line descending from the second end of the extendable boom meets perpendicularly with a virtual horizontal plane of a ground the vehicle is located, is determined as a product of (i) a sine value of angle α, which is the specific angle between the extendable boom and the virtual horizontal plane, and (ii) a length X, which is the predetermined length defined by a length between the first end to the second end of the extendable boom.

3. The watchtower vehicle of claim 1, wherein the control module controls or supports another module to control the main sensor mounting unit within the second angle range such that the main sensor mounting unit maintains its level by referring to the first horizontal slope.

4. The watchtower vehicle of claim 3, wherein a first end of a support structure is rotatably engaged with the second end of the extendable boom and a second end of the support structure is fixedly engaged with a base of the main sensor mounting unit, and a point in between the first end of the support structure and the second end of the support structure is engaged with a hydraulic device, and
wherein an inclined angle of the main sensor mounting unit is allowed to be adjusted within the second angle range in response to an actuation of the hydraulic device controlled by the control module.

5. The watchtower vehicle of claim 1, wherein the extendable boom is at least one of (i) a segmented boom capable of being extended to the predetermined length by extending one or more sub booms which are foldably engaged with a main boom, mounted onto the top plate, in a predetermined angle, (ii) a hydraulic boom capable of being extended to the predetermined length by drawing out one or more sub booms embedded in the main boom mounted onto the top plate, and (iii) a combination boom configured as a combination of the segmented boom and the hydraulic boom.

6. The watchtower vehicle of claim 1, wherein the top plate is rotatably engaged with the vehicle such that the top plate is allowed to be rotated by the control module.

7. The watchtower vehicle of claim 1, further comprising:
one or more outriggers mounted to the vehicle to thus fix the vehicle in place, adjust an inclination of the vehicle to level the vehicle, and distribute a load of the vehicle caused by the extendable boom.

8. A watchtower vehicle, comprising:
a top plate engaged with a top of a vehicle;
an extendable boom, with a first end thereof engaged with the top plate, capable of being extended up to a predetermined length, wherein the extendable boom is allowed to be inclined from a vertical axis of the top plate within a first angle range;

a main sensor mounting unit, engaged with a second end of the extendable boom, for mounting at least one sensor thereon, wherein the main sensor mounting unit is allowed to be inclined from a longitudinal axis of the extendable boom within a second angle range;

a sensor module unit including the sensor mounted on the main sensor mounting unit; and a control module for controlling or supporting another module to control at least one of the extendable boom within the first angle range and the main sensor mounting unit within the second angle range;

wherein the sensor module unit includes (i) an image sensor for photographing a surrounding situation, (ii) a first weather sensor for measuring a wind direction and a wind speed, and (iii) a first digital compass for measuring a first horizontal slope, which is a degree of inclination of the main sensor mounting unit from a horizontal state of the main sensor mounting unit, and a first deviated angle, which is a degree of deviation of the main sensor mounting unit from a true north, and wherein the first weather sensor is mounted on the main sensor mounting unit such that a reference direction of the wind direction measured by the first weather sensor corresponds to a direction of the true north measured by the first digital compass.

9. The watchtower vehicle of claim 8, wherein a final wind direction measured by the sensor module unit is determined by adding or subtracting the first deviated angle to or from the reference direction.

10. A watchtower vehicle, comprising:

a top plate engaged with a top of a vehicle;

an extendable boom, with a first end thereof engaged with the top plate, capable of being extended up to a predetermined length, wherein the extendable boom is allowed to be inclined from a vertical axis of the top plate within a first angle range;

a main sensor mounting unit, engaged with a second end of the extendable boom, for mounting at least one sensor thereon, wherein the main sensor mounting unit is allowed to be inclined from a longitudinal axis of the extendable boom within a second angle range;

a sensor module unit including the sensor mounted on the main sensor mounting unit; and a control module for controlling or supporting another module to control at least one of the extendable boom within the first angle range and the main sensor mounting unit within the second angle range;

wherein the watchtower vehicle further comprises:

at least one sub sensor mounting unit, which is engaged with at least one predetermined position of a side surface of the extendable boom, for mounting a second weather sensor and a second digital compass capable of measuring a wind direction and a wind speed, and wherein the sub sensor mounting unit is allowed to be inclined from the longitudinal axis of the extendable boom within a third angle range.

11. The watchtower vehicle of claim 10, wherein the control module controls or supports another module to control the sub sensor mounting unit within the third angle range such that the sub sensor mounting unit maintains its level by referring to a second horizontal slope which is a degree of inclination of the second digital compass from a horizontal state of the second digital compass.

12. The watchtower vehicle of claim 11, wherein the sub sensor mounting unit is engaged with a leveling unit mounted on the at least one predetermined position of the side surface of the extendable boom, wherein the leveling unit has grooves with a predetermined curvature formed therein to accommodate a rotating shaft driven by a servomotor at a center of the predetermined curvature.

13. The watchtower vehicle of claim 12, wherein a first support member formed on a side surface of the sub sensor mounting unit is engaged with the rotating shaft, and a second support member formed on the side surface of the sub sensor mounting unit is slidably engaged with the grooves along the predetermined curvature, and wherein the second support member is moved by a predetermined amount through an inward of the grooves with the predetermined curvature while the rotating shaft is rotating in response to an actuation of the servomotor by the control module, to thereby adjust an inclined angle of the sub sensor mounting unit.

14. The watchtower vehicle of claim 10, wherein the second weather sensor is mounted on the sub sensor mounting unit such that a reference direction of the wind direction measured by the second weather sensor corresponds to a direction of the true north measured by the second digital compass, and wherein a final wind direction measured by the second weather sensor and the second digital compass in the sub sensor mounting unit is determined by adding or subtracting a second deviated angle measured by the second digital compass, which is a degree of deviation of the sub sensor mounting unit from the true north, to or from the reference direction.

15. The watchtower vehicle of claim 10, wherein the sensor module unit includes (i) an image sensor for photographing a surrounding situation, (ii) a first weather sensor for measuring a wind direction and a wind speed, and (iii) a first digital compass for measuring a first horizontal slope, which is a degree of inclination of the main sensor mounting unit from a horizontal state of the main sensor mounting unit, and a first deviated angle, which is a degree of deviation of the main sensor mounting unit from a true north, wherein the control module controls or supports another module to control the extendable boom to be inclined at a specific angle within the first angle range by referring to the wind direction and the wind speed measured by the first weather sensor, wherein a latitude and a longitude of location information of the sub sensor mounting unit are determined by a latitude and a longitude of a GPS included in the vehicle, and wherein an altitude of the location information of the sub sensor module unit is determined by a sum of a second height, which is determined by referring to a height of the at least one predetermined position where the sub sensor mounting unit is engaged with and the specific angle, and an altitude of the GPS.

16. The watchtower vehicle of claim 15, wherein Z2, which is the second height measured from the at least one predetermined position of the extendable boom to an intersection point where a virtual line descending from the at least one predetermined position of the extendable boom meets perpendicularly with a virtual horizontal plane of a ground the vehicle is located, is determined as a product of (i) a sine value of angle $\alpha$, which is the specific angle between the extendable boom and the virtual horizontal plane, and (ii) a length Y, which is a length from the first end of the extendable boom to the at least one predetermined position.

* * * * *